US012073079B2

(12) United States Patent
Lee et al.

(10) Patent No.: US 12,073,079 B2
(45) Date of Patent: Aug. 27, 2024

(54) ZONE HINTS FOR ZONED NAMESPACE STORAGE DEVICES

(71) Applicant: Microsoft Technology Licensing, LLC, Redmond, WA (US)

(72) Inventors: Scott Chao-Chueh Lee, Bellevue, WA (US); Vadim Makhervaks, Bellevue, WA (US); Madhav Himanshubhai Pandya, Redmond, WA (US); Ioan Oltean, Redmond, WA (US); Laura Marie Caulfield, Woodinville, WA (US); Lee Edward Prewitt, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/044,976

(22) PCT Filed: Sep. 28, 2021

(86) PCT No.: PCT/US2021/071615
§ 371 (c)(1),
(2) Date: Mar. 10, 2023

(87) PCT Pub. No.: WO2022/072993
PCT Pub. Date: Apr. 7, 2022

(65) Prior Publication Data
US 2023/0342028 A1    Oct. 26, 2023

(30) Foreign Application Priority Data

Sep. 29, 2020    (LU) .................................. LU102091

(51) Int. Cl.
*G06F 3/06*    (2006.01)
*G06F 12/02*    (2006.01)

(52) U.S. Cl.
CPC ............ *G06F 3/0604* (2013.01); *G06F 3/061* (2013.01); *G06F 3/0631* (2013.01);
(Continued)

(58) Field of Classification Search
None
See application file for complete search history.

(56) References Cited

U.S. PATENT DOCUMENTS

2021/0303188 A1* 9/2021 Bazarsky ............ G06F 11/0751
2021/0373809 A1* 12/2021 Benisty ................. G06F 3/0644
(Continued)

OTHER PUBLICATIONS

"Notice of Allowance Issued in European Patent Application No. 21795233.2", Mailed Date: Sep. 27, 2023, 8 Pages. (MS# 408877-EP-EPT).
(Continued)

*Primary Examiner* — Kevin Verbrugge
(74) *Attorney, Agent, or Firm* — Workman Nydegger (57) ABSTRACT

Zone hints for use with a zoned namespace (ZNS) storage device. Zone hints include one or more of a first hint indicating that a zone is part of a group of a plurality of zones, a second hint indicating that the zone is to be fast-filled, or a third hint indicating that the zone is associated with a background operation. The first hint is structured to instruct the ZNS storage device to allocate to the zone a first storage resources that are physically adjacent to second storage resources reserved for others of the plurality of zones. The second hint is structured to instruct the ZNS storage device to bypass a staging area when writing to the zone. The third hint is structured to instruct the ZNS storage device to deprioritizing at least one operation writing to the zone, or to bypass the staging area when writing to the zone.

20 Claims, 5 Drawing Sheets

(52) U.S. Cl.
CPC .......... *G06F 3/0644* (2013.01); *G06F 3/0679* (2013.01); *G06F 12/0246* (2013.01)

(56) References Cited

U.S. PATENT DOCUMENTS

| | | | |
|---|---|---|---|
| 2022/0317878 A1* | 10/2022 | Lin | G06F 3/0644 |
| 2022/0317879 A1* | 10/2022 | Lin | G06F 3/0679 |
| 2022/0318157 A1* | 10/2022 | Hsu | G06F 3/0604 |
| 2022/0391115 A1* | 12/2022 | Muthiah | G06F 12/0607 |

OTHER PUBLICATIONS

Bjorling, Matias, "From Open-Channel SSDs to Zoned Namespaces", Retrieved From: https://www.usenix.org/sites/default/files/conference/protected-files/nsdi19_slides_bjorling.pdf, Jan. 23, 2019, 18 Pages.

Fomichev, Dmitry, "Linux Zoned Block Device Ecosystem", Retrieved From: https://ostconf.com/system/attachments/files/000/001/700/original/Dmitry-Fomichev-Linux-Piter19-talk-v6.pdf?1570452830, Oct. 2019, 40 Pages.

"Search Report and Written Opinion Issued in Luxembourg Patent Application No. LU102091", Mailed Date: Jul. 12, 2021, 6 Pages. (MS# 408877-LU-NP).

"International Search Report and Written Opinion Issued in PCT Application No. PCT/US21/071615", Mailed Date: Feb. 8, 2022, 10 Pages. (MS# 408877-WO-PCT).

\* cited by examiner

| | Z0, B0 | Z0, B1 | Z0, B2 | Z0, B3 | Z0, B4 | | Z0, B$n$ |
|---|---|---|---|---|---|---|---|
| Plane 0 | P | P | P | P | P | ... | P |
| Plane 1 | P | P | P | P | P | ... | P |
| Plane 2 | P | P | P | P | P | ... | P |
| Plane 3 | P | P | P | P | P | ... | P |

| Byte Offset | Field Name | Description |
|---|---|---|
| 15:0 | Zone Group ID | Zone Group ID value |
| 18:16 | Hints | Host provided hints<br><br>Bit 0: Background Operation<br>– If set to 1, zone is associated with a host background operation.<br><br>Bit 1: Fast fill<br>– If set to 1, zone programming operations are expected to be finish within a set period of time. |
| 19 | Zone Group Hint | Hints about zone within a zone group<br><br>0 – No hint available<br>1 – First zone within the zone group<br>255 – Last zone within the zone group |

ZONE HINTS FOR ZONED NAMESPACE STORAGE DEVICES

CROSS-REFERENCE TO RELATED APPLICATIONS

The present application is a U.S. National Stage of International Application No. PCT/US2021/071615, filed on Sep. 28, 2021, designating the United States and claiming the priority of Luxembourg Patent Application No. LU102091 filed with the Luxembourg Intellectual Property Office on Sep. 29, 2020. All of the aforementioned applications are incorporated herein in their respective entireties by this reference.

TECHNICAL FIELD

The present disclosure relates to systems, methods, and devices that improve performance and utilization of the storage devices through increased cooperation between software executing at a computer system and the storage device.

BACKGROUND

Historically, non-volatile storage devices utilized by computers have largely been block-based. That is, a storage device presents available storage as a sequential series of individual physical storage blocks, which map directly to corresponding sequential physical storage regions on an underlying physical storage medium—for example, a region of a magnetic storage platter in a hard disk drive (HDD), a region of a tape device, etc. Correspondingly, the interfaces traditionally used to access non-volatile storage devices have also been block based, and operating systems and other software have therefore interacted with non-volatile storage devices in terms of blocks with the understanding that sequential blocks presented by a storage device internally map to sequential physical regions of the device's underlying physical storage medium.

For compatibility and interoperability with existing hardware and software interfaces, more recent non-volatile storage devices have used these traditional storage interfaces, even though, internally, they may not actually map sequential external storage blocks to sequential physical storage regions. For example, solid state drives (SSDs) store data in integrated circuit assemblies comprising semiconductor cells-such as "not and" (NAND) flash, phase-change memory (PCM), and the like. Due to the physical nature of the underlying semiconductor cells, for purposes of caching, performance optimization, wear leveling, garbage collection, and the like, the "sequential" blocks externally presented by SSDs are intelligently distributed and re-distributed across the SSD's memory cells, rather than being internally sequential. Due to technologies such as shingled magnetic recording (SMR), even modern traditional HDDs lack a sequential mapping between externally-visible blocks and the underlying storage medium used.

This disconnect between hardware and software interfaces and the internal structure of storage media can result in sub-optimal use of the internal storage medium, resulting in storage waste, decreased performance, increased wear of the physical media, and increased power usage. In an effort to address these drawbacks, recent standards—such as the Zoned Namespace (ZNS) extension to the Non-Volatile Memory Express (NVMe) specification—have sought to more closely align software's view of a storage device with the internal storage characteristics of the storage device. In particular, a ZNS storage device is a block-based storage device that enables software to request creation of namespace "zones," where each zone comprises a plurality of blocks. Internally, a ZNS storage device treats each zone separately and distinctly, and attempts to allocate storage resources to a given zone in a manner that promotes efficient use of available storage, increased performance, decreased wear, decreased power usage, etc. Per the ZNS specification, each zone can only be written sequentially, and starting from the beginning of the zone. In addition, data within a given zone cannot be arbitrarily overwritten; instead, a zone is overwritten entirely by first (at least logically) erasing the zone, and then re-writing the zone from the beginning. Reads from the zone are largely unrestricted, so data can be read in much the same manner as on traditional storage devices.

BRIEF SUMMARY

While promoting a closer interaction between software and storage device internals, ZNS storage devices can present significant challenges for many software use cases. For instance, contemporary SSDs typically comprise a plurality of NAND flash memory dies, each comprising a plurality of memory cells that are, in turn, each capable of electronically storing one or more data bits (typically, one to four bits per cell). Many NAND dies arrange these memory cells into pages (which are the smallest structure that can be read or written), and then blocks (which are the smallest structure that can be erased). Contemporary NAND dies include multiple physical planes (e.g., vertically arranged), and are capable of forming a given block from multiple pages of a single plane (i.e., a single-plane block), or distributing a given block across two or more planes (i.e., a multi-plane block formed using pages from two or more planes). Since efficiencies are gained when accessing adjacent planes in parallel (e.g., in terms of throughput and energy usage), most ZNS storage devices only permit allocation of zones that are multiples of a die's single-plane size (and, thus, forming multi-plane blocks that span those planes). This means, for example, that the minimum zone size that software can request from a ZNS storage device may be on the order of 256 MB or more-a size so large that it is suboptimal for many software use cases.

Additionally, many ZNS storage devices only permit a given zone to be "open" for writing for a finite period of time. This may be due to one or more of practical issues (e.g., the complexities in managing a large number of open zone at once), or physical issues (e.g., a limited inability to keep a given NAND flash memory page open for writing due to physical constrains of the NAND memory cells).

At least some embodiments described herein enable a computer system to provide one or more zone-related "hints" to a ZNS storage device, for facilitating improvement of one or more of (i) the storage device's allocation of resources to a zone, or (ii) the storage device's later use of the zone. At least some embodiments described herein also enable ZNS storage devices to act on one or more zone-related "hints" to improve of one or more of (i) the storage device's allocation of resources to a zone, or (ii) the storage device's later use of the zone. Thus, at least some embodiments described herein describe interrelated products, including a computer system that operates to instruct a ZNS storage device using one or more hints (e.g., based on software executing thereon), and a ZNS storage device that operates responsive to those hint(s).

In embodiments, the one or more hints comprise a zone group hint, which enables a computer system to indicate that a particular zone is part of a plurality of zones that the computer system will program together as a group (for example, when writing to the zone group the computer system will stripe write operations across all zones within the group). In embodiments, the zone group hint enables a ZNS storage device to allocate storage resources to the particular zone that are physically adjacent to storage resources that have been (or will be) allocated to the other zone(s) in the group. In embodiments, when supporting the zone group hint, a ZNS storage device permits creation of zone sizes that lead to an otherwise non-natural (or sub-optimal) allocation of internal storage resources (e.g., by using single-plane blocks on a multi-plane NAND die, by using dual-plane blocks on a quad-plane NAND die, etc.), with the understanding that expected inefficiencies (e.g., in terms of performance, power usage, etc.) that would normally be incurred with this non-natural allocation will be eliminated (or at least mitigated) by the manner in which the computer system accesses the zone (i.e., by accessing the zone in parallel with physically related zones). As such, the zone group hint enables a computer system to request zone sizes that are better aligned to the computer system's use of those zones, while retaining the benefits of using larger zone sizes more appropriate to the physical characteristics of the ZNS storage device.

In embodiments, the one or more hints comprise a fast-fill hint, which enables a computer system to indicate that a particular zone will be "fast-filled" when written to (i.e., programmed). In embodiments, the fast-fill hint communicates to a ZNS storage device that, when a request to write to the zone is made, all data to be written will be timely provided at the time of the request. Since all data to be written can be timely provided, the ZNS storage device is assured that it will not need to hold a zone "open" for writing while it waits for the data to be written to become fully available, enabling the ZNS storage device to bypass a data staging area (e.g., a cache or a dedicated region of an underlying storage medium) and write the data to the zone directly. As such, the fast-fill hint improves write performance by reducing a number of write operations needed to perform a write (i.e., by bypassing the staging area), reduces use of staging area storage resources, and can increase an operational lifespan of the staging area storage if the staging area storage has limited endurance (as is the case with NAND flash, for example).

In embodiments, the one or more hints comprise a background operation hint, which enables a computer system to indicate that I/O operations to a particular zone will be related to background activity. In embodiments, the background operation hint communicates to a ZNS storage device that, when I/O operations are issued to the zone, those operations can be deprioritized with respect to other I/O operations. In an example of deprioritizing an I/O operation, a ZNS storage device holds one or more I/O operations issued to a first zone assigned the background operation hint until completion of one or more I/O operations issued to second zone not assigned the background operation hint. As such, the background operation hint improves overall performance of the ZNS storage device by enabling the device to focus on higher priority I/O operations. In some embodiments, a hint may comprise a background operation hint but not comprise a (explicit or implicit) fast-fill hint. In some embodiments, a hint may comprise both a background operation hint and an explicit fast-fill hint. In some embodiments, the background operation hint inherently implies a fast-fill hint. In embodiments, one or more I/O operations issued to a first zone assigned both a background operation hint and an explicit or implicit fast-fill hint is held until completion of one or more I/O operations issued to a second zone assigned the fast-fill hint but not the background operation hint.

In embodiments, method, systems, and computer program products operate to utilize a hint for a zone when interacting with a ZNS storage device. In these embodiments, a computer system determines that the zone, which is for storing at least a portion of a dataset, is to be defined on the ZNS storage device. The computer system sends one or more messages to the ZNS storage device. The message(s) instruct the ZNS storage device to create the zone, and to provide one or more hints for the zone to the ZNS storage device. The hint(s) for the zone include at least one of, (i) a first hint indicating that the zone is part of a group of a plurality of zones, (ii) a second hint indicating that the zone is to be fast-filled, or (iii) a third hint indicating that the zone is associated with a background operation. When included, the first hint is structured to instruct the ZNS storage device to allocate to the zone a first portion of storage resources that is physically adjacent to a second portion of second storage resources reserved for others of the plurality of zones. When included, the second hint is structured to instruct the ZNS storage device to bypass a staging area when writing to the zone. When included, the third hint is structured to instruct the ZNS storage device to perform at least one of (i) deprioritizing at least one operation writing to the zone, or (ii) bypassing the staging area when writing to the zone.

In related embodiments, a ZNS storage device operates responsive to hint(s) provided by a computer system. In these related embodiments, the ZNS storage device comprises physical data storage resources, as well as logic that configures the ZNS storage device to operate in response to a hint for a zone. Based at least on identifying an instruction received from the computer system, the logic creates a record of the zone. Based at least on identifying one or more hints for the zone that are received from the computer system, the logic performs at least one of, (i) when the hint(s) for the zone include a first hint indicating that the zone is part of a group of a plurality of zones, allocating to the zone a first portion of the physical data storage resources that is physically adjacent to a second portion of the physical data storage resources reserved for others of the plurality of zones; (ii) when the hint(s) for the zone include a second hint indicating that the zone is to be fast-filled, bypassing a staging area when writing to the zone; or (iii) when the hint(s) for the zone include a third hint indicating that the zone is associated with a background operation, performing at least one of (i) deprioritizing at least one operation writing to the zone, or (ii) bypassing the staging area when writing to the zone.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
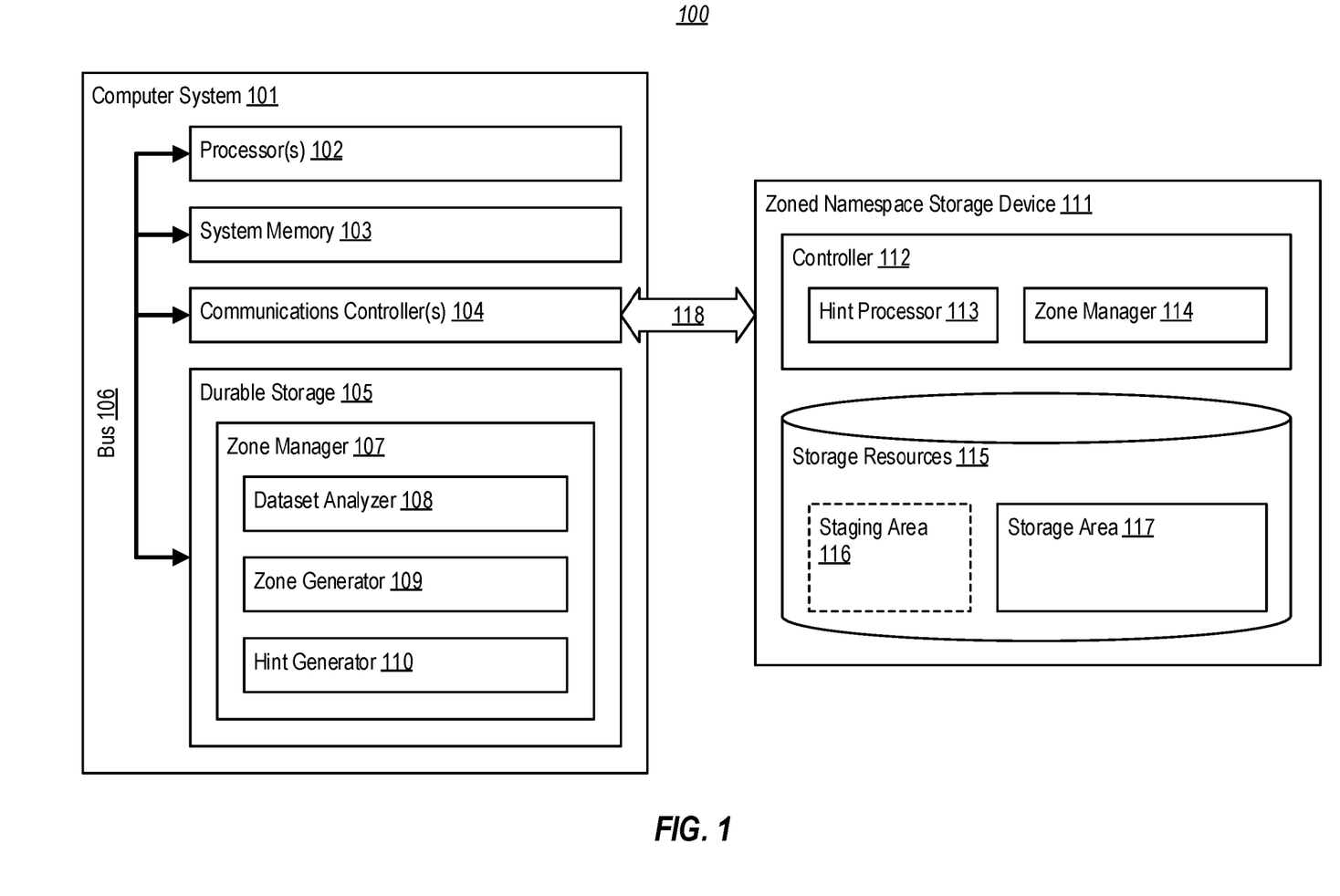
FIG. 1 illustrates an example computer architecture that facilitates utilizing zone hints for ZNS storage devices.

FIG. 1 illustrates an example computer architecture 100 that facilitates utilizing zone hints for ZNS storage devices. Computer architecture 100 includes a computer system 101 and a ZNS storage device 111. Computer system 101 includes one or more processors 102, system memory 103, one or more communications controllers 104, and durable storage 105, which are communicatively coupled via a bus 106. The ZNS storage device 111 is illustrated as using one (or more) of the communications controllers 104 in order to communicate with computer system 101 over communications channel 118. Although not expressly depicted, the ZNS storage device 111 may be electrically coupled the bus 106 directly or may be electrically coupled with the communications controller 104. The particular type of the communications controller 104 can vary, such that the ZNS storage device 111 is located proximate to (or even an integral part of) computer system 101, or such that the ZNS storage device 111 is located remote from computer system 101.

The ZNS storage device 111 is illustrated as comprising a controller 112 (including a hint processor 113 and a zone manager 114) and storage resources 115 (including a storage area 117 and potentially including a staging area 116). The particular form of storage resources 115 can vary, and in at least some embodiments the storage resources 115 comprise one or more of an integrated circuit-based storage medium (e.g., NAND flash, PCM, etc.) or a magnetic storage medium (e.g., one or more magnetic hard drive patters).

The durable storage 105 is illustrated as including a zone manager 107. In general, the zone manager 107 operates to create and manage storage zones at the ZNS storage device 111, based on dataset(s) that are to be stored by the computer system 101 at the ZNS storage device 111. To facilitate this functionality, the zone manager 107 is illustrated as including a dataset analyzer 108, a zone generator 109, and a hint generator 110.

The dataset analyzer 108 identifies and analyzes datasets that are to be stored at the ZNS storage device 111, in order to determine one or more attributes of those datasets. In embodiments, these attribute(s) include one or more of a dataset size, a dataset type, a dataset source, a dataset availability, a type of operation associated with creation of the dataset, an identity of one or more related datasets, and the like. Using this analysis, the dataset analyzer 108 determines that one or more zone(s) are to be created for storing one or more datasets.

The zone generator 109 generates requests for creation of zones at the ZNS storage device 111, such as one or more zones to be used to store one or more datasets identified and analyzed by the dataset analyzer 108. In embodiments, the zone generator 109 generates requests for creation of zones based on one or more dataset attributes determined by the dataset analyzer 108, such as dataset size and dataset availability. For example, the zone generator 109 may use a dataset size to determine at least one of a number or a size of zones needed to store a dataset. In another example, the zone generator 109 may use a dataset size and an identity of to one or more related datasets determine at least one of a number or a size of zones needed to store a dataset, together with the one or more related datasets. In another example, the zone generator 109 may use a dataset availability to determine at least one of a number or a size of zones needed to store an available portion of the dataset.

Using one or more messages sent over a communications channel 118, the zone manager 107 communicates one or more zone creation requests generated by the zone generator 109 to the controller 112 at the ZNS storage device 111. In turn, the zone manager 114 at the ZNS storage device 111 creates the requested zone(s), including allocating storage resources in the storage area 117 to each zone. In some embodiments, the zone manager 114 returns an acknowledgement/success message to the zone manager 107 upon successful creation of a zone, or returns a failure/error message to the zone manager 107 if the zone cannot be created (e.g., due to lack of available storage resources within the storage area 117).

The hint generator 110 generates one or more hints for one or more zones generated by the zone generator 109. These hints are structured to instruct the ZNS storage device 111 to operate in some particular manner with respect to the zone(s) to which the hint applies. In embodiments, the hint generator 110 generates hints based on one or more dataset attributes determined by the dataset analyzer 108.

Using one or more messages (which may be the same messages discussed previously, or may be separate messages) sent over communications channel 118, the zone manager 107 communicates one or more hints generated by the hint generator 110 to the controller 112 at the ZNS storage device 111. In turn, the hint processor 113 at the ZNS storage device 111 causes the ZNS storage device 111 to at least attempt to operate in accordance with these hints. In some embodiments, the hint processor 113 treats hints as suggestions and makes a "best effort" attempt to operate in accordance with the hints. In these embodiments, the hint processor 113 is free to ignore (or even reject) a hint should it so choose (e.g., if the hint would negatively impact performance of the ZNS storage device 111, if the ZNS storage device 111 lacks the capability or resources to honor the hint, etc.). In other embodiments, the hint processor 113 treats hints as binding instructions, and makes every reasonable effort to operate in accordance with the hints. In these other embodiments, the hint processor 113 may refuse an operation if it cannot honor a hint associated with that operation. In some embodiments, the hint processor 113 returns acknowledgement, success, error, failure, etc. messages to the zone manager 107 as appropriate, though in other embodiments the hint processor 113 sends no return messages to the zone manager 107 (i.e., it is silent as to whether or not it honored the hint).

In an embodiment, the hint generator 110 generates a zone group hint, which indicates that the zone to which this hint applies is part of a zone group (i.e., comprising two or more zones). In some embodiments, the hint generator 110 generates the zone group hint for a zone when that zone has a size that is less than a natural (e.g., optimal or preferred)

zone size for the ZNS storage device 111 (i.e., based on physical characteristics of the storage resources 115), and thus the zone manager 107 has grouped the zone with one or more other zones such that a size of the group matches a natural zone size for the ZNS storage device 111. In embodiments, this group of zones stores related datasets which will be written/programmed together as a group by computer system 101. For example, when programming the zone group the computer system 101 stripes write operations across all zones within the group. In embodiments, the zone group hint is an instruction operable (i.e., by the hint processor 113) to cause the ZNS storage device 111 to allocate physically adjacent storage resources to zones in the group in order to gain performance benefits and power efficiencies when the computer system 101 stripes I/O operations across all zones within the group.

Figure 2A:
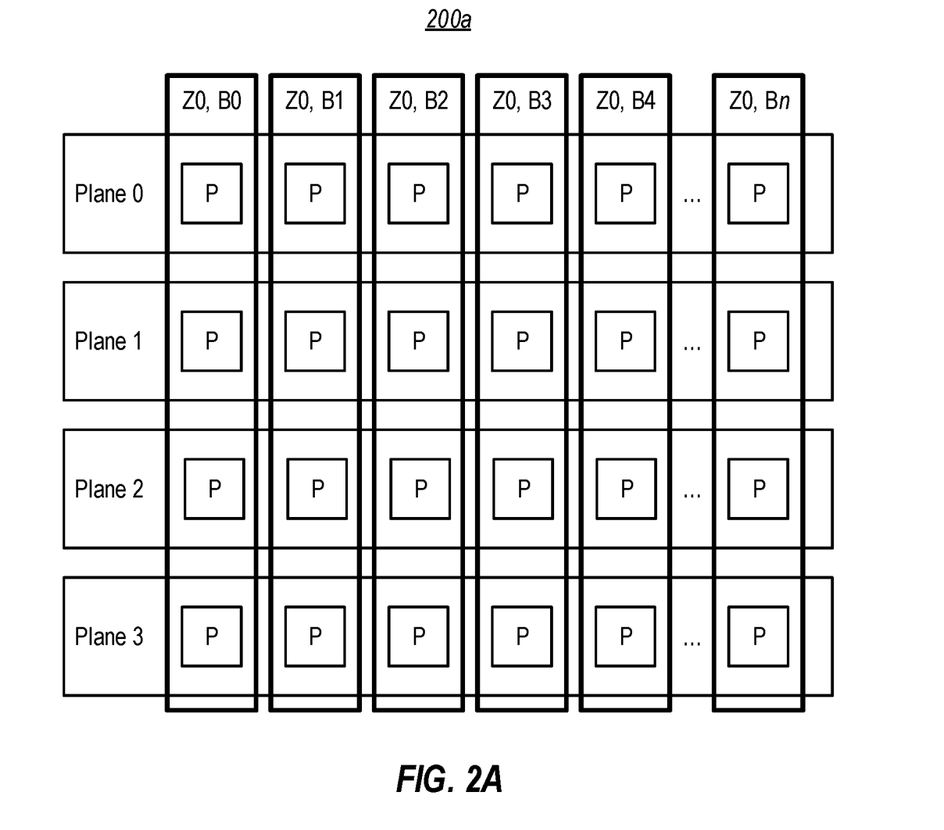
FIG. 2A illustrates an example of an allocation of a naturally-sized storage zone within NAND flash media.
Figure 2B:
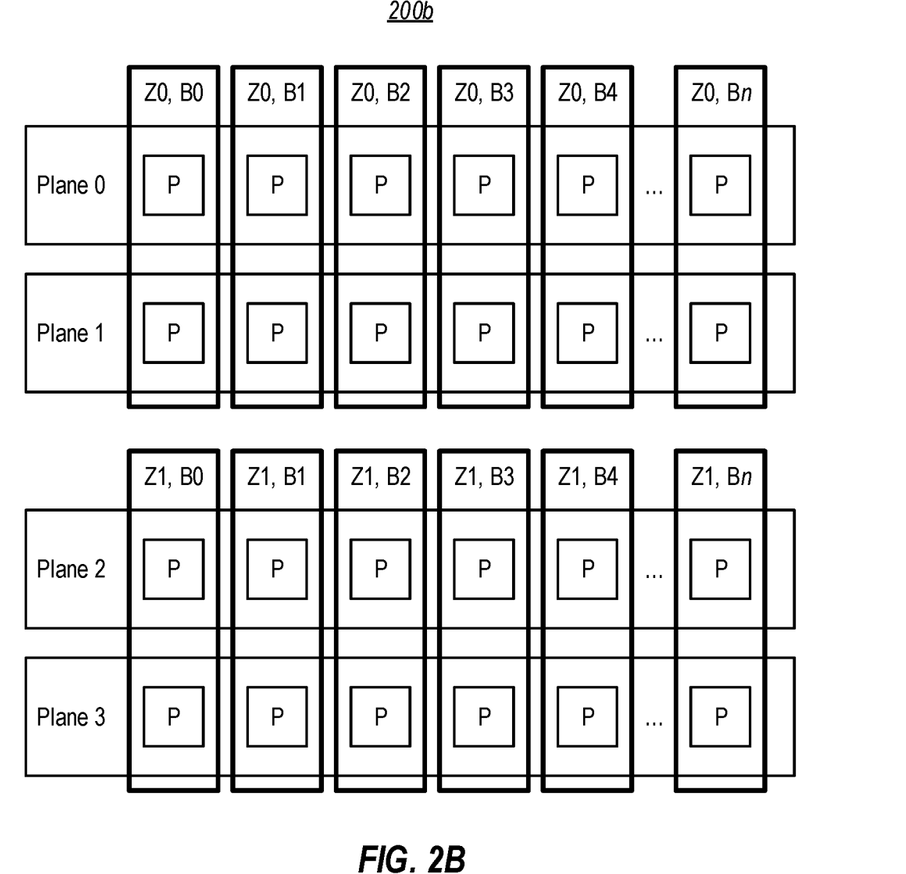
FIG. 2B illustrates an example of an allocation of a group of non-naturally-sized storage zones that together reach a natural zone size of NAND flash media.

FIGS. 2A and 2B demonstrate this concept. In particular, FIG. 2A illustrates an example 200a of an allocation of a naturally-sized storage zone within NAND flash media. FIG. 2A shows a plurality of NAND flash planes (i.e., "Plane 0" to "Plane 3"), such as planes which are vertically-arranged on the same NAND flash die. Each of these planes comprises a plurality of pages (P), which are each composed of a plurality of NAND memory cells. In FIG. 2A, the physical storage resources (i.e., the pages) within these planes are illustrated as being allocated into a single zone (i.e., Z0) comprising a plurality of blocks (i.e., B0-Bn). As shown, the first block (i.e., B0) of the zone is allocated using a first page from each of the four planes, the second block (i.e., B1) of the zone is allocated using a second page from each of the four planes, the third block (i.e., B2) of the zone is allocated using a third page from each of the four planes, and so on. Here, the zone has a "natural" size for the NAND flash media, since its blocks are comprised of pages spanning all of the die's vertically-arranged planes. Due to the physical characteristics of NAND flash media, in this configuration the zone is sized and allocated for efficient (and perhaps even optimal) performance and power usage when programming the zone, since each of the four planes are accessed together when programming the zone. In some situations, however, a size of the zone of FIG. 2A presents challenges to software executing at computer system 101, which operates on datasets that are smaller than this zone's size-particularly since zones are programmed in an append-only manner.

FIG. 2B, on the other hand, illustrates an example 200b of an allocation of a group of non-naturally-sized storage zones that together reach the natural zone size of the NAND flash media. FIG. 2B shows the same plurality of vertically-arranged NAND flash planes (i.e., "Plane 0" to "Plane 3"), each comprising a plurality of pages (P) composed of NAND memory cells. In FIG. 2B, however, the physical storage resources (i.e., the pages) within these planes are illustrated as being allocated into two zones-one (Z0) comprising blocks B0-Bn allocated from pages in plane 0 and plane 1, and another (Z1) comprising blocks B0-Bn allocated from pages in plane 2 and plane 3. In embodiments, this allocation is made based on the hint processor 113 acting on one or more hints generated by the hint generator 110, designating zones Z0 and Z1 as being part of a zone group. Here, each of zones Z0 and Z1 have a "non-natural" size for the NAND flash media, since their blocks are comprised of pages spanning less than all of the die's vertically-arranged planes. Due to the physical characteristics of NAND flash media, in this configuration the each of zones Z0 and Z1 is sized and allocated for less efficient power usage (i.e., as compared to the configuration of FIG. 2A) when the zone is programmed individually (i.e., since only two of the four planes are accessed together when programming the zone). However, since zones Z0 and Z1 are allocated from physically adjacent planes, if the computer system 101 stripes write operations across zones Z0 and Z1, then the efficient (and perhaps even optimal) performance and power usage of the configuration of FIG. 2A can be achieved during zone programming (i.e., since each of the four planes are then programmed together).

In some situations, a size of the zones of FIG. 2B will better align with a size of datasets utilized by software executing at computer system 101. Thus, generation of the zone group hint by the hint generator 110 enables the zone generator 109 to create non-naturally sized zones for the ZNS storage device 111 (which are suitable for a dataset size utilized by software), while enabling the ZNS storage device 111 to operate on naturally-sized groups of zones, and to achieve the performance and power efficiencies associated therewith.

In additional, or alternative, embodiments the hint generator 110 generates a fast-fill hint, which indicates that write operations for zone to which this hint applies will be able to timely supply all data needed to fulfill the write (e.g., without exceeding any constraints that the ZNS storage device 111 may have, such as with respect to an amount of time that a zone can be "open" for a write). In some embodiments, the hint generator 110 generates the fast-fill hint when all data needed to fulfill a write will be available at the time of the write, or can guarantee availability of the data needed to fulfill a write once the write begins. In embodiments, the fast-fill hint is an instruction operable (i.e., by the hint processor 113) to cause the ZNS storage device 111 to bypass a staging area, such as a cache, when writing to the zone. For example, FIG. 1 illustrates that the ZNS storage device 111 may include a staging area 116. In some ZNS storage devices the staging area 116 utilizes a common physical storage media as the storage area 117 (e.g., both using NAND flash, both using magnetic storage, etc.). In other ZNS storage devices the staging area 116 utilizes a different physical storage media than the storage area 117 (e.g., one using NAND flash and the other using magnetic storage, one using random access memory and the other using NAND flash, etc.). By using the fast-fill hint to bypass the staging area, the ZNS storage device 111 reduces a number of operations needed to carry out a write operation, which leads to increased write performance, decreased power usage, decreased usage of the staging area 116's available storage space, and decreased wear on the underlying physical storage media supporting the staging area 116.

In additional, or alternative, embodiments the hint generator 110 generates a background operation hint, which indicates that I/O operations for a zone to which this hint applies relate to background activity by the computer system 101. In some embodiments, the hint generator 110 generates the background operation hint when data that is to be programmed to a zone is generated by background operations performed by computer system 101. In some embodiments (e.g., when a background operation performed by computer system 101 is a low priority operation), the background operation hint is an instruction operable (i.e., by the hint processor 113) to cause the ZNS storage device 111 to deprioritize one or more I/O operations received from computer system 101 that target the zone to which the hint applies, as compared to one or more other I/O operations being handled by the ZNS storage device 111. In an example of deprioritizing an I/O operation, a ZNS storage device holds one or more I/O operations issued to a first zone assigned the background operation hint until completion of one or more I/O operations issued to second zone not assigned the background operation hint. As such, the background operation hint improves overall performance of the ZNS storage device 111 by enabling the device to focus on higher priority I/O operations.

In additional, or alternative, embodiments (e.g., when a background operation performed by computer system 101 can timely produce the data needed for a write), the background operation hint also comprises or is interpreted as a fast-fill hint operable (i.e., by the hint processor 113) to cause the ZNS storage device 111 to bypass the staging area 116 when writing to the zone to which the hint applies. As such, in these embodiments, the background operation hint also leads to increased write performance, decreased power usage, decreased usage of the staging area 116's available storage space, and decreased wear on the underlying physical storage media supporting the staging area 116. In some embodiments, a hint may comprise a background operation hint but not comprise a (explicit or implicit) fast-fill hint. In some embodiments, a hint may comprise both a background operation hint and an explicit fast-fill hint. In embodiments, one or more first I/O operations issued to a first zone assigned both a background operation hint and an explicit or implicit fast-fill hint is held until completion of one or more I/O operations issued to a second zone assigned the fast-fill hint but not the background operation hint.

As discussed, the zone group hint indicates that a plurality of zones are part of a zone group. In embodiments, the zone group hint assigns a zone group identifier with the zone group. In some embodiments, this zone group identifier is applicable to the zone group hint only. In other embodiments, however, this zone group identifier is also applicable to one or both of the fast-fill hint or the background operation hint. Thus, in embodiments, assigning a fast-fill hint or a background operation hint applies that hint to each of the plurality of zones that are associated with the zone group identifier.

In some embodiments, the zone manager 107 communicates any hint(s) to the ZNS storage device 111 via one or more commands, or as parameters to one or more commands. In one example, the zone manager 107 communicates any hint(s) to the ZNS storage device 111 as parameters to a zone creation command. In another example, the zone manager 107 communicates any hint(s) to the ZNS storage device 111 using command(s) whose specific function is to communicate hints.

Figure 3:
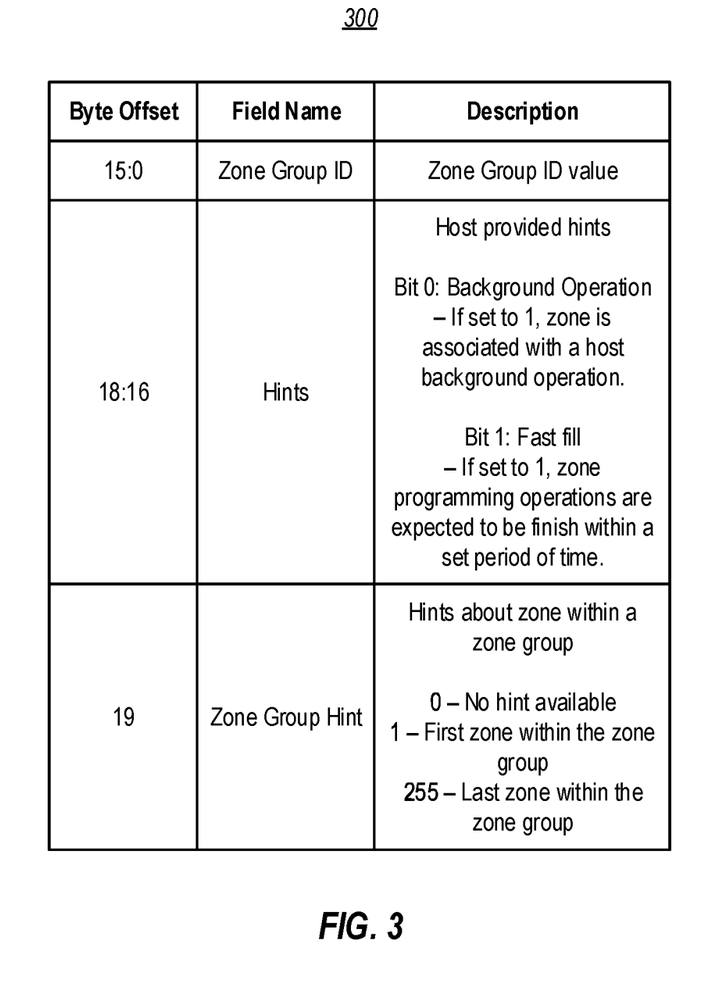
FIG. 3 illustrates an example of a metadata format usable for communicating one or more hints specific to a zone.

In additional, or alternative, embodiments, the zone manager 107 communicates any hint(s) to the ZNS storage device 111 by setting one or more fields in zone-specific metadata. For example, FIG. 3 illustrates an example 300 of a non-limiting metadata format usable for communicating one or more hints specific to a zone. As shown in FIG. 3, the example metadata format comprises a zone group identifier field. In embodiments, the zone group identifier field is used to define a zone group identifier for the zone to which the metadata applies. In embodiments, this same group identifier is commonly used for each zone in a group of zones. Thus, for example, the zone manager 107 sets the zone group identifier field to a common value in the zone-specific metadata for each zone in a zone group. As shown in FIG. 3, the example metadata format also comprises a hints field. In embodiments the hints field is used to assign one, or both, of a background operation hint or a fast-fill hint to the zone to which the metadata applies. As shown in FIG. 3, the example metadata format also comprises a zone group hint field. In embodiments the zone group hint field is used to specify that the zone is not part of a zone group (e.g., with a value of 0), or to specify an identifier for the zone within the zone group (e.g., 1 to 255, in the example).

As demonstrated in example 300, in some embodiments the zone manager 107 indicates to the ZNS storage device 111 which zones are to be a part of a group by communicating to the ZNS storage device 111 a common zone group identifier for each of those zones (e.g., using a zone group identifier metadata field associated with each zone). In these embodiments, the hint processor 113 identifies which zones are part of a given zone group by determining that this common zone group identifier has been specified for a plurality of zones. In alternative embodiments, the zone manager 107 indicates to the ZNS storage device 111 which zones are to be a part of a group by directly communicating to the ZNS storage device 111 a list or range of zones that are to be part of a group, potentially with a zone group identifier. In these embodiments, the hint processor 113 identifies which zones are part of a given zone group by based on this directly communicated list or range of zones.

The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

Figure 4:
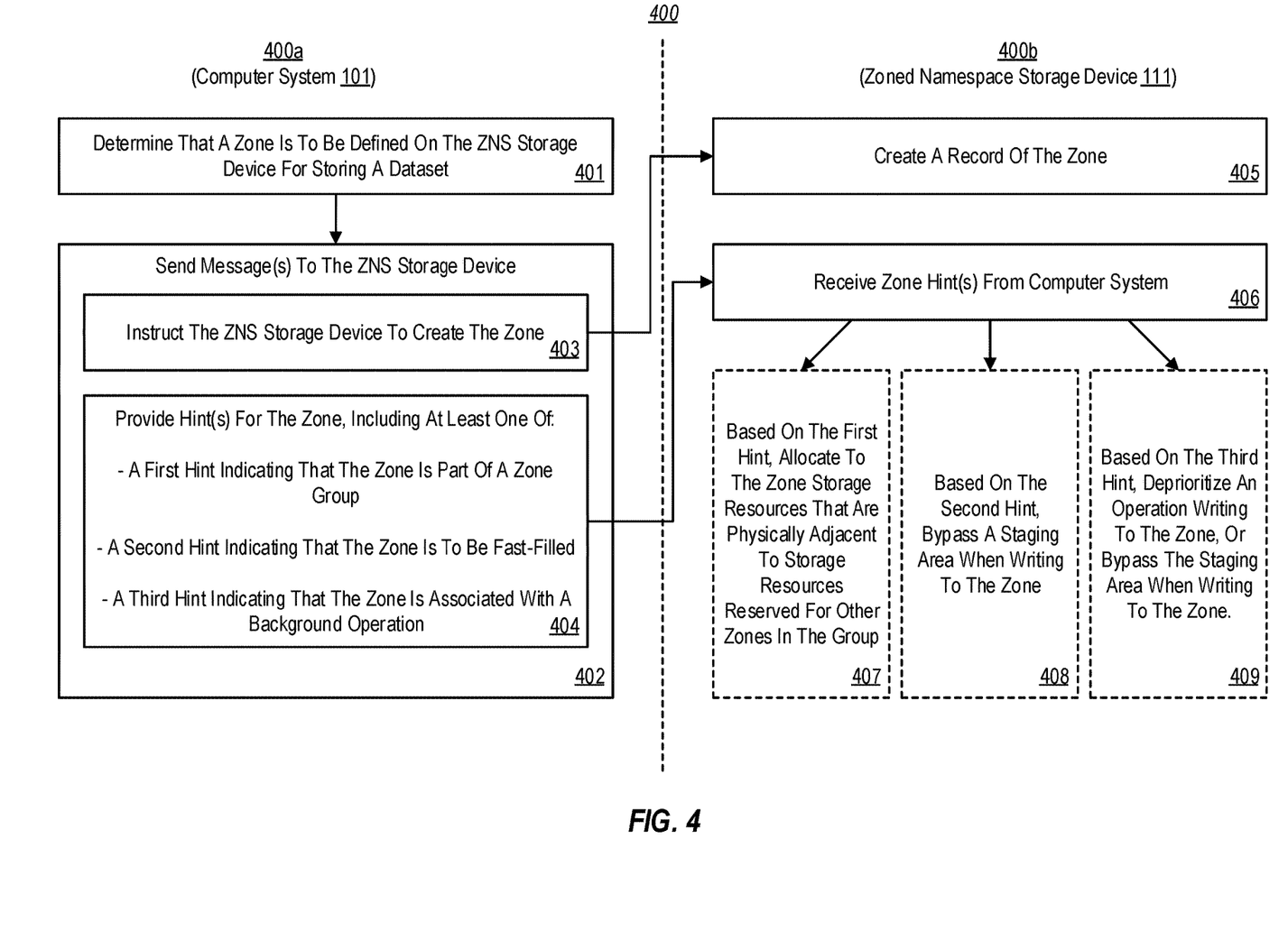
FIG. 4 illustrates a flow chart of an example method for utilizing zone hints for ZNS storage devices.

FIG. 4 illustrates a flow chart of an example method 400 for utilizing zone hints for ZNS storage devices. Method 400 will be described with respect to the components and data of computer architecture 100. As shown, method 400 includes acts (i.e., 401-404) that are part of a sub-method 400a, performed by computer system 101, for utilizing a hint for a zone when interacting with ZNS storage device 111. Method 400 also includes acts (i.e., 405-409) that are part of a sub-method 400b, performed by ZNS storage device 111, for operating in response to a hint for a zone. In embodiments the ZNS storage device 111 comprises physical data storage resources (e.g., storage resources 115, such an integrated circuit assembly or a magnetic storage medium) and logic (e.g., controller 112) for implementing acts 405-409. In some embodiments method 400 is a single integrated method performed by computer architecture 100 as a whole, while in other embodiments method 400 comprises separate, but related, methods 400a/400b performed by computer system 101 and ZNS storage device 111, respectively.

Initially, method 400a comprises an act 401 of determining that a zone is to be defined on the ZNS storage device for storing a dataset. In some embodiments, act 401 comprises determining that the zone is to be defined on the ZNS storage device, the zone for storing at least a portion of a dataset. In an example, based on an analysis of a dataset by the dataset analyzer 108, the dataset analyzer 108 determines that at least one zone is to be created for storing at least a portion of the dataset.

Method 400a also comprises an act 402 of sending one or more messages to the ZNS storage device. As shown, act 402 comprises an act 403 of instructing the ZNS storage device to create the zone, and an act 404 of providing hint(s) for the zone.

In act 403, the one or more messages instruct the ZNS storage device to create the zone. In an example, the zone generator 109 generates a request for creation of the zone at the ZNS storage device 111, based on generating one or more messages (e.g., commands), and initiating sending of those message(s) by the zone manager 107 to the ZNS storage device over communications channel 118.

As shown, based upon receipt of the message(s) described in act 403, method 400b comprises an act 405 of creating a record of the zone. In some embodiments, act 405 comprises, based at least on identifying an instruction received from a computer system, creating a record of the zone. In an example, the zone manager 114 creates a record of the zone, which includes initiating an allocation of storage resources 115 from the storage area 117 to the zone.

In act 404, the one or more messages provide one or more hints for the zone (i.e., to the ZNS storage device 111). In an example, the hint generator 110 generates one or more hints for the zone requested by the zone generator 109 in act 403, and initiates sending of message(s) by the zone manager 107 over communications channel 118 to communicate those hint(s) to the ZNS storage device 111.

As discussed, in some embodiments the zone manager 107 communicates hint(s) to the ZNS storage device 111 using direct commands (or command parameters). Thus, in some embodiments of act 404 the one or more messages provide the one or more hints for the zone to the ZNS storage device based at least on communicating a command with respect to the zone. As also discussed, in some embodiments the zone manager 107 communicates hint(s) to the ZNS storage device 111 using metadata fields, such as those shown in FIG. 3.

Thus, in some embodiments of act 404 the one or more messages provide the one or more hints for the zone to the ZNS storage device based at least on setting one or more hint-specific fields within metadata associated with the zone.

As explained, in some embodiments the hint generator 110 determines which hint(s) to send for a particular zone based on attributes of the data to be stored in the zone, such as a size of the data, an availability of the data, a source of the data, etc., as determined by the dataset analyzer 108. As such, in some embodiments, method 400a comprises determining the one or more hints for the zone based on identifying one or more attributes of the dataset.

As shown in FIG. 4, based upon receipt of the message(s) described in act 404, method 400b comprises an act 406 of receiving zone hint(s) from computer system. In some embodiments, act 406 comprises identifying one or more hints for the zone that are received from the computer system. In an example, the hint processor 113 receives the hint(s) generated by the hint generator 110 in act 404.

Notably, no particular ordering is shown between acts 403 and 404, indicating that those acts could be performed serially or parallelly, depending on implementation. Similarly, no particular ordering is shown between acts 405 and 406, indicating that those acts could be performed serially or parallelly, depending on implementation. Additionally, it is noted that, depending on implementation, the messages sent in acts 403 and 404 could be the same messages, or could be different messages altogether.

As shown in act 404, in some embodiments the hint(s) include a first hint indicating that the zone is part of a zone group. Thus, in some embodiments, act 404 comprises the one or more hints including a first hint indicating that the zone is part of a group of a plurality of zones, the first hint structured to instruct the ZNS storage device to allocate to the zone a first set of storage resources that is physically adjacent to a second set of second storage resources reserved for others of the plurality of zones. In an example, the hint generator 110 generates a zone group hint for the zone, and sends that hint to the ZNS storage device 111 over communications channel 118.

As mentioned previously, in some embodiments the zone manager 107 indicates to the ZNS storage device 111 which zones are to be a part of a group by communicating to the ZNS storage device 111 a common zone group identifier for each of those zones. Thus, in some embodiments of act 404 the first hint includes a zone group identifier, and each of the plurality of zones in the group are associated with the zone group identifier. As mentioned also previously, in some embodiments the zone manager 107 indicates to the ZNS storage device 111 which zones are to be a part of a group by directly communicating to the ZNS storage device 111 a list or range of zones that are to be part of a group (potentially with a zone group identifier). Thus, in other embodiments of act 404 the first hint includes an identity of each of the plurality of zones in the group.

When the one or more hints include the first (i.e., zone group) hint, method 400b comprises and act 407 of, based on the first hint, allocating to the zone storage resources that are physically adjacent to storage resources reserved for other zones in the group. In some embodiments, act 407 comprises, when the one or more hints for the zone include a first hint indicating that the zone is part of a group of a plurality of zones, allocating to the zone a first portion of the physical data storage resources that is physically adjacent to a second portion of the physical data storage resources reserved for others of the plurality of zones. In an example, as part of the allocation of storage resources 115 from the storage area 117 to the zone that was initiated in act 405, the hint processor 113 ensures that physically-adjacent storage resources are allocated to zones in the same zone group. An example of this was described in connection with FIG. 2B, in which pairs of physically adjacent NAND flash planes (i.e., a first pair comprising planes 0 and 1 and a second pair comprising planes 2 and 3) were used in a resource allocation to zones (i.e., Z0 and Z1) in the same zone group.

As shown in act 404, in some embodiments the hint(s) include a second hint indicating that the zone is to be fast-filled. Thus, in some embodiments, act 404 comprises the one or more hints including a second hint indicating that the zone is to be fast-filled, the second hint structured to instruct the ZNS storage device to bypass a staging area when writing to the zone. In an example, the hint generator 110 generates a fast-fill hint for the zone, and sends that hint to the ZNS storage device 111 over communications channel 118.

When the one or more hints include the second (i.e., fast-fill) hint, method 400b comprises and act 408 of, based on the second hint, bypassing a staging area when writing to the zone. In some embodiments, act 408 comprises, when the one or more hints for the zone include a second hint indicating that the zone is to be fast-filled, bypassing a staging area when writing to the zone. In an example, based on having received the second hint for a particular zone, when the controller 112 later processes a programming operation for the zone the hint processor 113 ensures that the programming operation bypasses the staging area 116 and is applied to the storage area 117 directly.

As shown in act 404, in some embodiments the hint(s) include a third hint indicating that the zone is associated with a background operation. Thus, in some embodiments, act 404 comprises the one or more hints including a third hint indicating that the zone is associated with a background operation, the third hint structured to instruct the ZNS storage device to perform at least one of (i) deprioritizing at least one operation writing to the zone, or (ii) bypassing the staging area when writing to the zone. In an example, the hint generator 110 generates a background operation hint for the zone, and sends that hint to the ZNS storage device 111 over communications channel 118.

When the one or more hints include the third (i.e., background operation) hint, method 400b comprises and act 409 of, based on the third hint, deprioritizing an operation writing to the zone, or bypassing the staging area when writing to the zone. In some embodiments, act 409 comprises, when the one or more hints for the zone include a third hint indicating that the zone is associated with a background operation, performing at least one of (i) deprioritizing at least one operation writing to the zone, or (ii) bypassing the staging area when writing to the zone. In one example, based on having received the third hint for a particular zone, when the controller 112 later processes an I/O operation for the zone, the hint processor 113 ensures that the I/O is processed with a lower priority than at least one other operation. In another example, based on having received the third hint for a particular zone, when the controller 112 later processes a programming operation for the zone, the hint processor 113 ensures that the programming operation bypasses the staging area 116, and is applied to the storage area 117 directly.

As discussed, in embodiments, a zone group identifier is applicable to one or both of the fast-fill hint or the background operation hint, and assigning the fast-fill hint or the background operation hint applies that hint to all zones that are associated with the zone group identifier. Thus, in embodiments, providing the second hint indicating that the zone is to be fast-filled comprises applying the second hint to each zone in the group of the plurality of zones (thereby associating each of those zones with the fast-fill hint). Similarly, in embodiments, providing the third hint indicating that the zone is associated with a background operation comprises applying the third hint to each zone in the group of the plurality of zones (thereby associating each of those zones with the background operation hint).

Notably, in embodiments, one software use case for which the disclosed zone hints are beneficial is data storage that utilizes "error coding" techniques to provide data durability with efficient use of storage resources. Some conventional error coding implementations initially store an incoming dataset redundantly, such as by storing three replicas of the dataset—each into a different filesystem extent that is "sealed" when the extent is filled. Once an extent is sealed, it becomes read-only and is subject to erasure coding. Under erasure coding, one extent is divided into a number of same-sized data fragments (thus, a data fragment is smaller than an extent), along with mathematically derived code fragments that can be used to reproduce any data fragments (later if lost). The extents initially storing the dataset can then be garbage collected, and further reads of the dataset are served via the data fragments.

In some error coding implementations, it may be preferable to have fragment sizes that are 128 MB or below, and to map fragments to ZNS zones when using ZNS storage devices, such that extents are built from multiple zones. However, many ZNS storage devices may have a natural zone size that is much larger than 128 MB, such as 256 MB or larger. Using the disclosed group hint, the embodiments herein enable fragments to be mapped to zones that are smaller than the natural zone size for a ZNS storage device (e.g., 128 MB instead of 256 MB), but retain "natural" ZNS storage device performance by accessing those fragments as a group. Additionally, using the disclosed fast-fill hint, zones corresponding to fragments can be fast-filled, since the data used to fill those zones is already available (i.e., because a fragment is sourced from an already filled/sealed extent).

Finally, some embodiments consider erasure coding a background operation, and in these embodiments the disclosed background operation hint enables a ZNS storage device to deprioritize I/O operations related to those background operations, as needed, to maintain overall performance of the ZNS storage device.

Accordingly, at least some embodiments described herein enable a computer system to provide one or more zone-related "hints" to a ZNS storage device, and enable ZNS storage devices to act on one or more zone-related "hints" to improve of one or more of (i) the storage device's allocation of resources to a zone, or (ii) the storage device's later use of the zone. In embodiments, these hints include a zone group hint that enables the computer system to request zone sizes that are aligned to the computer system's use of those zones, while retaining the benefits of using larger zone sizes more appropriate to the physical characteristics of the ZNS storage device. In embodiments, these hints include a fast-fill hint, which enables the ZNS storage device to bypass a data staging area when programming the zone directly, improving write performance, reducing use of staging area storage resources, and increasing an operational lifespan of the staging area storage. In embodiments, these hints include a background hint, which enables the ZNS storage device to deprioritize I/O operations to the zone (improving overall performance of the ZNS storage device), or to treat the zone as fast-fill.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set" and "subset" are indented to exclude an empty set, and thus "set" and is defined as a non-empty set, and "subset" is defined as a non-empty subset. Additionally, unless otherwise specified, the term "subset" excludes the entirety of its superset (i.e., the superset contains at least one item not included in the subset).

What is claimed:

1. A method, implemented at a computer system that includes a processor, for utilizing a hint for a zone when interacting with a zoned namespace storage device, the method comprising:
   determining that the zone is to be defined on the zoned namespace storage device, the zone for storing at least a portion of a dataset; and
   sending a message to the zoned namespace storage device, the message:
      instructing the zoned namespace storage device to create the zone; and
      providing a hint for the zone to the zoned namespace storage device, the hint for the zone comprising at least one of:
         a first hint indicating that the zone is part of a group of zones comprising a plurality of zones, the first hint structured to instruct the zoned namespace storage device to allocate to the zone a first portion of storage resources that is physically adjacent to a second portion of second storage resources reserved for others of the group of zones;

a second hint indicating that the zone is to be fast-filled, the second hint structured to instruct the zoned namespace storage device to bypass a staging area when writing to the zone; or a third hint indicating that the zone is associated with a background operation, the third hint structured to instruct the zoned namespace storage device to deprioritize an operation writing to the zone.

2. The method of claim 1, wherein the hint is the first hint.

3. The method of claim 2, wherein, as a result of receiving the first hint, the zoned namespace storage device allocates to the zone the first portion of storage resources that is physically adjacent to the second portion of second storage resources allocated to others of the group of zones.

4. The method of claim 1, wherein the hint is the second hint.

5. The method of claim 4, wherein, as a result of receiving the second hint, the zoned namespace storage device bypasses the staging area when writing to the zone.

6. The method of claim 1, wherein the hint is the third hint.

7. The method of claim 6, wherein, as a result of receiving the third hint, the zoned namespace storage device deprioritizes the operation writing to the zone.

8. The method of claim 1, wherein the message provides the hint for the zone based at least on communicating a command with respect to the zone to the zoned namespace storage device or setting a hint-specific field within metadata associated with the zone.

9. The method of claim 1, wherein the first hint includes a zone group identifier, and each zone in the group of zones associated with the zone group identifier.

10. The method of claim 1, wherein the first hint includes an identity of each zone in the group of zones.

11. The method of claim 1, further comprising determining the hint for the zone based on identifying an attribute of the dataset.

12. A zoned namespace storage device, comprising:
physical data storage resources; and
logic that configures the zoned namespace storage device to at least:
based at least on identifying an instruction received from a computer system, create a record of a zone; and
based at least on identifying a hint for the zone, perform at least one of:
when the hint for the zone is a first hint indicating that the zone is part of a group of zones comprising a plurality of zones, allocate to the zone a first portion of the physical data storage resources that is physically adjacent to a second portion of the physical data storage resources reserved for others of the group of zones;
when the hint for the zone is a second hint indicating that the zone is to be fast-filled, bypass a staging area when writing to the zone; or
when the hint for the zone is a third hint indicating that the zone is associated with a background operation, deprioritize an operation writing to the zone.

13. The zoned namespace storage device of claim 12, wherein the hint for the zone is the first hint, and wherein the zoned namespace storage device allocates to the zone the first portion of the physical data storage resources that is physically adjacent to the second portion of the physical data storage resources reserved for others of the group of zones.

14. The zoned namespace storage device of claim 12, wherein the hint for the zone is the second hint, and wherein the zoned namespace storage device bypasses the staging area when writing to the zone.

15. The zoned namespace storage device of claim 12, wherein the hint for the zone is the third hint, and wherein the zoned namespace storage device deprioritizes the operation writing to the zone.

16. The zoned namespace storage device of claim 12, wherein the hint for the zone is identified from a command received from the computer system, or from a hint-specific field within metadata associated with the zone.

17. The zoned namespace storage device of claim 12, wherein the first hint includes a zone group identifier, and each zone in the group of zones is associated with the zone group identifier.

18. The zoned namespace storage device of claim 12, wherein the first hint includes an identity of each zone in the group of zones.

19. A computer program product comprising a hardware storage device having stored thereon instructions that are executable by a processor to cause a computer system to at least:
instruct a zoned namespace storage device to create a zone for storing at least a portion of a dataset; and
provide a hint for the zone to the zoned namespace storage device, the hint for the zone comprising at least one of:
a first hint indicating that the zone is part of a group of zones comprising a plurality of zones, the first hint structured to instruct the zoned namespace storage device to allocate to the zone a first portion of storage resources that is physically adjacent to a second portion of second storage resources reserved for others of the group of zones;
a second hint indicating that the zone is to be fast-filled, the second hint structured to instruct the zoned namespace storage device to bypass a staging area when writing to the zone; or
a third hint indicating that the zone is associated with a background operation, the third hint structured to instruct the zoned namespace storage device to deprioritize an operation writing to the zone.

20. The computer program product of claim 19, wherein providing the hint for the zone is based at least on communicating a command with respect to the zone to the zoned namespace storage device, or setting a hint-specific field within metadata associated with the zone.

* * * * *